E. W. DANIEL.
WIRE ROPE SOCKET.
APPLICATION FILED NOV. 25, 1921.

1,421,676.

Patented July 4, 1922.

INVENTOR
Edward W. Daniel
BY
Brockett & Hyde
ATTYS

UNITED STATES PATENT OFFICE.

EDWARD W. DANIEL, OF CLEVELAND, OHIO.

WIRE-ROPE SOCKET.

1,421,676.  Specification of Letters Patent.  Patented July 4, 1922.

Application filed November 25, 1921. Serial No. 517,708.

*To all whom it may concern:*

Be it known that I, EDWARD W. DANIEL, a citizen of the United States, residing at Cleveland, in the county of Cuyahoga and State of Ohio, have invented certain new and useful Improvements in Wire-Rope Sockets, of which the following is a specification.

This invention relates to improvements in wire rope sockets.

The object of this invention is to provide a wire rope socket in which a separate shank is attached to the cup member and in which a shank of the desired length can be readily formed and the parts readily assembled; and furthermore to provide for the use of a shank with means for an adjustable connection to a given holding member so as to make it possible to take up any slack in the cable.

Other objects of this invention will appear from the following description and claims when considered together with the accompanying drawings.

Figure 1:
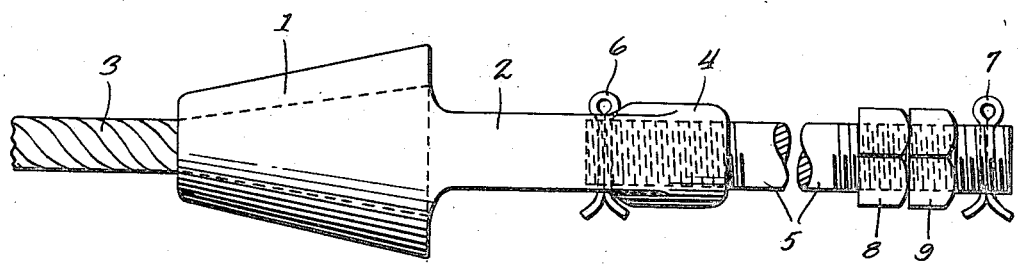
Figure 2:
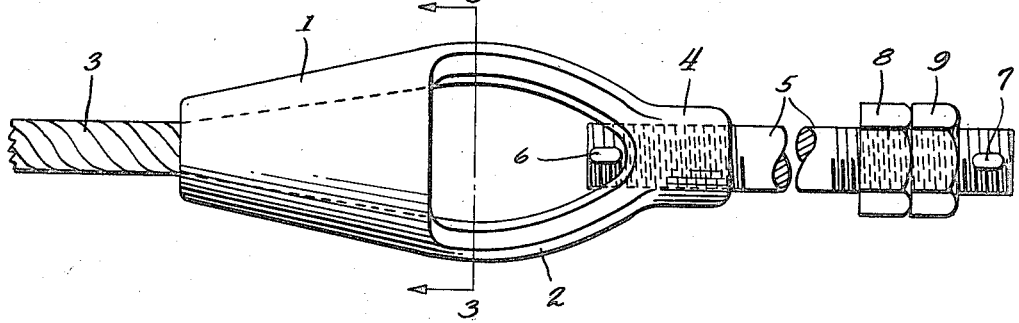
Figure 3:
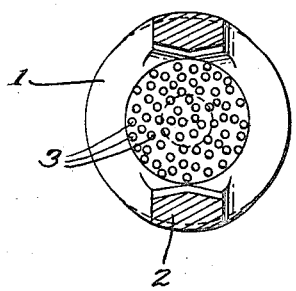

Fig. 1 is a side view of the cup and shank members in assembly; Fig. 2 is a side view taken at 90° to Fig. 1; and Fig. 3 is a section taken on line 3—3, Fig. 2.

The cup member 1 with the arched diametrically disposed arms 2, which are integral with the cup member, are formed by either forging or casting. The cup member has an opening of tapering form extending therethrough in a direction lengthwise of the socket and is adapted to receive and hold the end of a wire cable 3. The strands of the cable end are separated or mushed and secured in the cup in such condition by means of Babbitt metal which is poured therein. The arms terminate in an integral head portion 4, which has a threaded bore lengthwise therethrough. This bore is adapted to receive one end portion of the threaded shank 5 which has a cotter pin 6 extending therethrough so as to prevent accidental removal of the shank from the head portion 4. The other end of the shank is provided also with the cotter pin 7 to prevent accidental removal of the nut 8 and its lock nut 9. These nuts serve to connect a suitable collar member to the shank member as a means of attaching this socket to a given holding member or support, as for instance when used with an elevator. With this arrangement it is possible to adjust the nuts and thereby adjust the effective length of the shank member so as to take up any slack in the cable.

From the above it will be seen that it is possible to select the proper length of shank member from stock metal and by simply threading the same it can be assembled with the cup member so as to form the desired length of socket according to a given set of conditions. Thus it is not necessary to keep in stock different sizes of sockets in complete form. Wire rope sockets are now found on the market with the cup and shank made up in integral form, or with these parts secured together by more or less complicated connection. Besides being capable of ready construction and assembly of the parts, the applicant's device possesses all necessary strength without any more danger of breaking at one point than at any other point throughout the length of the shank.

Thus I have provided a structure which means a decided saving in cost because of the ability to select the parts from stock and readily assemble the same according to given conditions; and I obtain also substantially uniform strength throughout. Furthermore, the adjustable feature, which makes it possible to take up any slack in the cable increases the efficiency of any given size of my device.

Other advantages flowing from this invention will be apparent to those who are skilled in the art to which it relates.

What I claim is:

A wire rope socket comprising a tapered cup and symmetrically arranged arms integral with said cup and extending from the larger end thereof, said arms terminating in an integrally formed head, said cup being provided with an aperture through the smaller end thereof in the direction of the longitudinal axis of said cup, and said head having a threaded aperture extending therethrough in alignment with the aperture through said cup, and a threaded shank having one end portion engaging the threaded aperture of said head, and adjustable connecting means provided upon the other end of said shank, thereby providing means for taking up slack in the cable.

In testimony whereof I hereby affix my signature.

EDWARD W. DANIEL.